July 7, 1970 C. D. RUSSELL 3,519,336
REARVIEW MIRROR ADAPTER FOR ANGLING THE MIRROR BY REMOTE CONTROL
Filed Nov. 10, 1966 3 Sheets-Sheet 1

INVENTOR
CARL D. RUSSELL

BY
ATTORNEYS

July 7, 1970        C. D. RUSSELL        3,519,336
REARVIEW MIRROR ADAPTER FOR ANGLING THE MIRROR BY REMOTE CONTROL
Filed Nov. 10, 1966        3 Sheets-Sheet 2

INVENTOR
CARL D. RUSSELL

BY Fisher, Christen, Sabol & Caldwell

ATTORNEYS

July 7, 1970        C. D. RUSSELL        3,519,336
REARVIEW MIRROR ADAPTER FOR ANGLING THE MIRROR BY REMOTE CONTROL
Filed Nov. 10, 1966        3 Sheets-Sheet 3
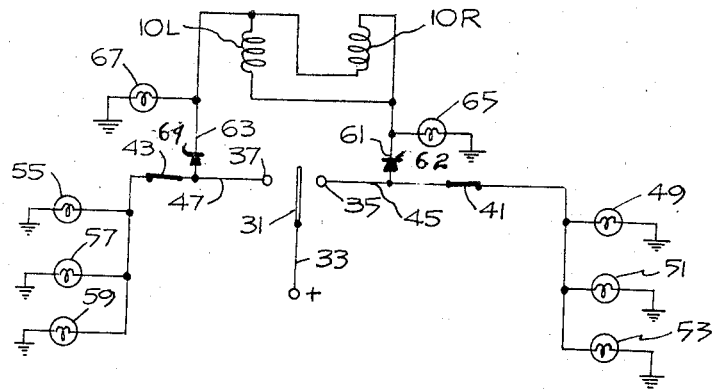
Fig. 10
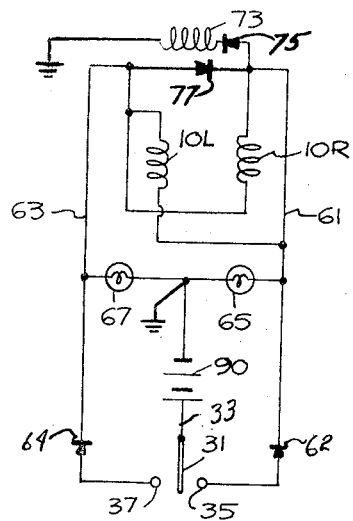
Fig. 12
Fig. 11
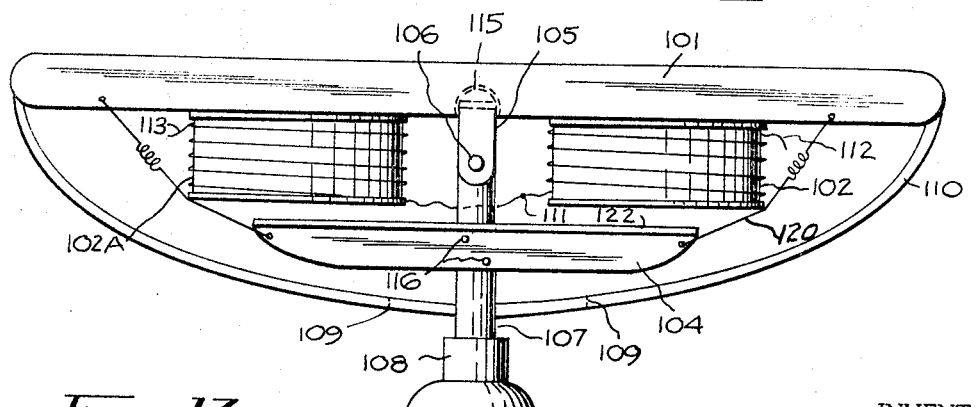
Fig. 13
INVENTOR
CARL D. RUSSELL
BY Fisher, Christen, Sabol & Caldwell
ATTORNEYS

United States Patent Office 3,519,336
Patented July 7, 1970

3,519,336
REARVIEW MIRROR ADAPTOR FOR ANGLING THE MIRROR BY REMOTE CONTROL
Carl D. Russell, Muskogee, Okla., assignor, by mesne assignments, to Engineering Automotive Sciences Inc., a corporation of Maryland
Filed Nov. 10, 1966, Ser. No. 593,516
Int. Cl. G02b 5/08
U.S. Cl. 350—289
3 Claims

ABSTRACT OF THE DISCLOSURE

The invention relates to vehicular mirror angling apparatus for insertion between a mirror and its vehicular support to maintain universal adjustability of the mirror while also providing for side-to-side angling of the mirror to alter the angle of rear view in response to operation of the vehicle turn indicator lever. Electromagnetic coils are supported by either the mirror case or a frame, which establishes pivotal movement for the mirror relative to the vehicle. The electromagnetic coils attract the other one of the mirror case or frame to angle the mirror in response to energize under control of the vehicle turn indicator lever. The angling movement can be produced by both magnetic attraction and repulsion.

---

The present invention relates to a device for angling a conventional vehicular rearview mirror in order to avoid blind areas, particularly when the vehicle is being turned to the right or left, and to electrical control circuitry therefor. While numerous inventions have been made in the field, the present invention is in the nature of apparatus suitable for use by the manufacturer as a component for new vehicles or for use with most existing mirror support structures, i.e., with universal adaptor structure for connection to that part affixed permanently to the vehicle. In addition, the present invention provides a much simpler, less expensive and more effective apparatus for achieving the desired result, and may double or quadruple the operating forces available in known devices.

The apparatus of this invention enables the mirror to be angled to the right or to the left in accordance with the operation of the turn indicator signal lever. It achieves this action through the use of electromagnetic means, preferably a pair of electromagnets selectively actuated from the electrical system of the car, under the control of the turn indicator signal lever in either signalling position. A right-hand turn indication energizes both magnets in one polarity and a left-hand turn indication energizes both magnets in the opposite polarity thereby causing the mirror to be angled in one direction or the other, the mirror being pivotally mounted relative to the electromagnet supporting structure. The magnets are effective relative to armatures comprising either a permanent magnet having north and south poles or an electromagnet comprising a strip of magnetizable material in which the polarization may be maintained.

It should be pointed out that either the electromagnets may be carried by the mirror and the armature rigidly fixed to the frame in order that the mirror can be angled relative to the frame by either magnet pulling to the armature with the opposite magnet pushing therefrom. Alternatively, the armature may be affixed to the back of the mirror case and the electromagnets rigidly carried on the frame in order that the mirror may be angled to either electromagnet.

Basically, a box-like structure is provided for housing the electromagnets and for receiving a pivot mounting mirror extension shaft. In turn, in one embodiment, the housing carries a ball which may be gripped for establishing a universal connection thereto from the vehicle attachment.

The invention contemplates the use of inexpensive plastic connectors comprising merely either a bifurcated or a slotted tube with inner recessed circular area or areas to receive a ball or rod and including an outer housing or equivalent through which clamping means may compress the split plastic tube about the ball or rod to be gripped, with the ball lying in the relieved circular areas thereby providing good gripping.

Another feature of the invention resides in the provision of locking fingers, respectively provided for each electromagnet, and operative by its associated electromagnet to fix the position of the pivotal structure carried by the box in cooperation with the electromagnet drawing the mirror thereto. Additionally, the opposite locking finger cooperates in the same function by virtue of a locking finger spring normally biasing each locking finger in the direction of the pivotal structure. Of course, the energized electromagnet is sufficiently strong as to overcome the locking spring for its associated locking finger, and both act simultaneously.

A feature of the invention resides in the use of the turn indicator circuitry of the vehicle, in slightly modified manner to achieve a perfect operating control for energizing the coils in either polarization. Present day vehicles include a single thermal switch in the lead extending to the turn indicator switch. The purpose of this thermal-switch is to blink the indicator lights intermittently off and on. The single switch is sufficient, because it is located in the common lead, and whether or not a right or left turn is indicated, it will blink the desired set of turn lights.

The present invention contemplates the use of two thermal switches in lieu of the single conventional thermal switch. These thermal switches are disposed in the lead lines from the turn indicator switch to the various lights in the sets on either side; i.e., front, back, and dash turn lights. The electromagnetic coils are energized for the respective polarizations from the leads extending respectively to the right-hand turn and left-hand turn signalling lamps. It is important to note that these coils may complete a circuit to or from ground before the main leads of the signalling circuits including the thermal switches, respectively complete the circuit through the lamps to ground. In this manner, the intermittent operation of the lights will not be reflected into the electromagnet energization circuits, but the conventional existing circuitry is useable for the necessary control herein described.

Preferably, the electromagnets utilize the permanent magnetic strip as their armature, have their coils connected in parallel across the turn indicator switch to be polarized respectively north and south for one turn indication and south and north for the opposite turn indication. In this manner, the pivot power for angling is multiplied and the components may be diminished in size, such that an assembly measuring less than one inch in thickness may be carried on the back side of the mirror to effect the angling operation without obtrusiveness. In this arrangement, the leads for the parallel combination are each preferably extended to ground, by way of a small low resistance lamp or low resistance wire (relative to the electromagnet coil resistance), in order that current flow may be developed in opposite directions (for opposite turn signalling) to effect the requisite polarization. A resistor or resistance wire may be used with or in the coils, as necessary for current and voltage distribution control.

In the embodiment employing the electromagnetic armature, it is preferred that the coil for the armature be also connected in parallel with the two electromagnetic coils, but otherwise the circuitry in function is similar to that described. Of course, the circuitry is effective on all vehicles whether equipped with a positive or negative ground.

With the foregoing in mind, it is among the objects of this invention to provide mirror angling structure and circuitry for positioning an electromagnet means relative to a vehicular mirror while affording a pivotal connection between the mirror and the electromagnet means and a universal connection between the mirror and the vehicle.

It is a further object of the invention to provide such an arrangement including cooperating locking fingers.

A still further object of the invention is the provision of an adaptor capable of universal connection to a rod or ball type connector, in such an arrangement.

Another object is the provision of an electrically controlled mirror angling apparatus, capable of angling a vehicular rear-view mirror, in response to the turn indicator lever, from a modified vehicular electrical system.

It is a further object to provide such apparatus and circuitry wherein one or more electromagnetic coils is carried by the back of a mirror or case therefor and a permanently magnetized or electro-magnetizable armature is fixed to a support for the mirror, such that proper polarization will multiply the angling forces.

A still further object of the invention is the provision of the foregoing structure with the armature carried by the mirror and the coil means carried by the support, and Yet another object is the provision of electric circuitry operable from the vehicle battery system to provide enhanced motive power for angling a rearview mirror.

The invention will be better understood from a consideration of the appended drawings in which:

FIG. 1 is a view in elevation of the box supporting structure of a first embodiment, without the mirror, FIG. 2 is a view in top plan of the box supporting structure with the mirror carried thereby, FIG. 3 shows the structure of FIG. 2 with the mirror angled to the right, FIG. 4 is a view in end elevation of the structure of FIG. 1, FIG. 5 shows a suitable connector structure for use with the present invention, as seen in side elevation, FIG. 6 is an elevational showing of a different type connector in association with the box ball, FIG. 7 shows the connector of FIG. 5, squeezed together, as in a gripping relation, FIG. 8 shows a still further type connector in elevation, FIGS. 9 and 9a show the locking finger in side elevation and in plan.

FIG. 10 shows a suitable circuit arrangement for operating a pair of electromagnets from a modified turn indicator vehicle signalling circuit.

FIG. 11 is a view in side elevation of a magnetizable strip with coil for attachment to the back of a mirror case or to the frame to serve as an armature for the electromagnets.

FIG. 12 shows a suitable circuit, operable from the vehicle turning indicator circuit, incorporating a pair of electromagnets and the electromagnetizable armature, and, FIG. 13 is a view in top plan of a further modification of the invention wherein the electromagnets are carried by the mirror case and a frame crossbar serves as or carries the armature therefor.

Figure 1:
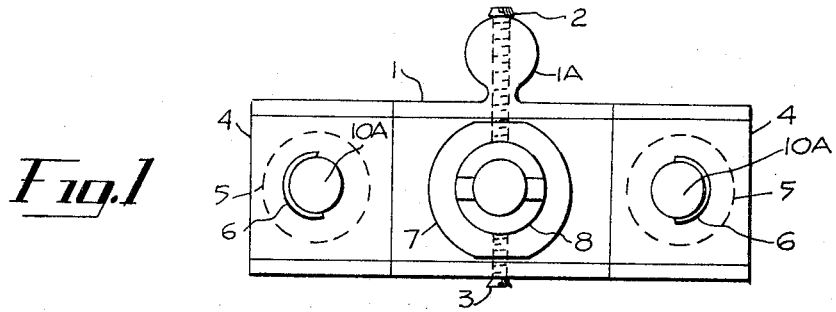
Figure 2:
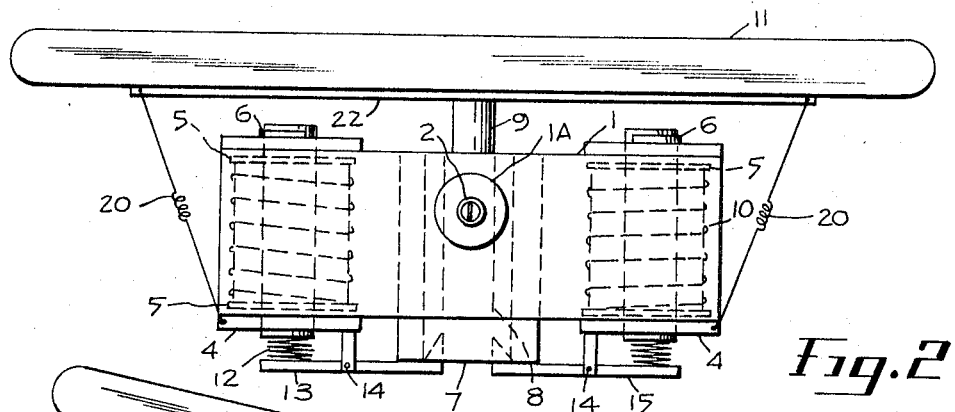

Referring now to the drawings, and particularly to FIGS. 1 through 4, it may be seen that a housing 1 is provided which is generally ultimately in the form of a box, except that two opposite side walls are open in the center to accommodate shaft locking means 8 and pivoting hub 7 and the ends are open, in order that the electromagnetic coils 10, carried on spools 5, may be readily inserted in the positions shown, and secured by plates 4, welded or otherwise affixed to the housing 1, to support the former.

Figure 5:
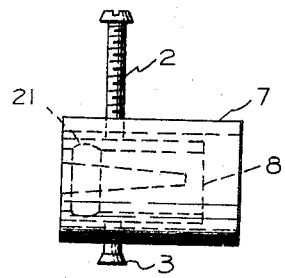
Figure 7:
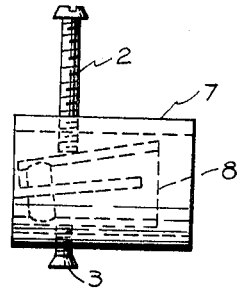

The top of the housing 1 is provided with a ball 1A through which a pivot and clamp screw 2 extends vertically to apply pressure to shaft locking means 8, shown as a split plastic tube, better seen in detail in FIGS. 5 and 7.

The cores 10A for the electromagnets protrude through opposite openings in the plates 4 so that they are exposed beyond the housing 1. One or more locking rings 6 retain this assembly.

Bottom pivot screw 3 (FIGS. 1 and 4) is provided in order that the sleeve 8 may be compressed, from opposite directions, thereby maintaining shaft 9 of mirror case 11 centrally disposed in hub 7. Centering springs 20 are shown disposed between plates 4 and the mirror case 11 (armature 22) to return the mirror to its normal position when both coils 10 are de-energized. The springs 20 may be cylindrical or any suitable conventional type.

Figure 3:
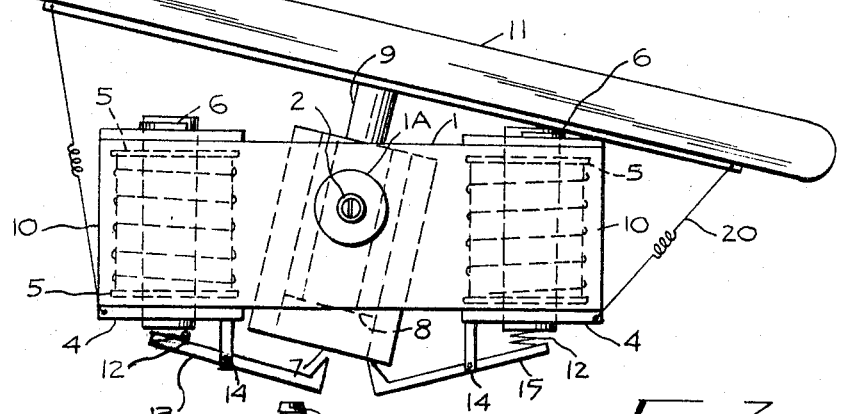
Figure 4:
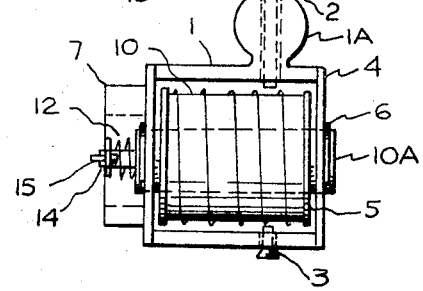

It may be appreciated that the pivot, established by pivot and clamp screw 2, enables the mirror case 11 to be angled in the direction of either electromagnet, as is best seen in FIG. 3 for our orientation.

Figure 9:
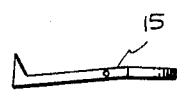
Figure 9A:
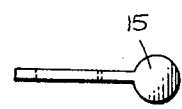

A pair of locking fingers 13 and 15 is provided with the rear plates 4 being provided with yokes 14 in which the fingers 13 and 15 are pivotally mounted. Fingers 13 and 15 are normally urged to the position shown in FIG. 2 by springs 20, preferably affixed to back plates 4. Examination of finger 15, as best seen in FIG. 9, shows that one end carries a tapered pushing portion and the opposite end terminates in a circular area, substantially conforming in size to core 10A (see FIG. 4). The material of the fingers is magnetizable and, as may be seen in FIG. 3, when the coils 10 are energized, both locking fingers 15 are pulled to the unlocked position, the magnetic forces being sufficient to overcome the locking springs 12. The importance of the locking fingers resides in the elimination of any tendency of oscillation or vibration in movement of mirror case 11 and in their ability to lock the apparatus in non-signalling position which permits the vehicle operator to position the mirror to his own driving position.

Looking now at the detailed showing of FIGS. 5 through 9, it should be pointed out that the pivoting hub 7 is preferably a nylon tube and the shaft locking means 8 is a plastic tube, split as shown. In FIG. 7, screws 2 and 3 have been turned inwardly to compress the bifurcated sleeve 8. The inner surface of the shaft locking sleeve 8 is relieved away in a circular peripheral area 21 in order that this connection may securely accommodate a ball, as well as a shaft.

Figure 6:
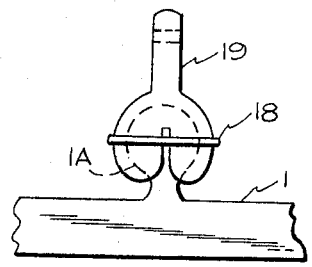
Figure 8:
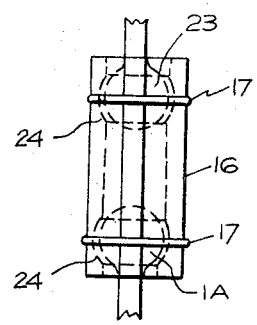

FIGS. 6 and 8 are provided to show connections presently useful for installing the present apparatus in General Motors and Ford products, resectively. In FIG. 6, the ball 1A of case 1 is gripped by the bifurcated gripper 19, already installed in the vehicle. A tightening band 18 of spring wire is provided to insure this connection.

In FIG. 8, a tube 16 enables a connection between the two balls, the lower ball being 1A of the adaptor and the upper ball 23 being the vehicle fixed structure. In this case, the sleeve 16 is not bifurcated but rather is split longitudinally at one location only. It also includes the relieved circular areas 24 for gripping the balls 1A and 23 with the bands 17 being provided to insure the engagement.

The preferred circuit for operating the electromagnets 5 is shown in FIG. 10. Turn indicator switch 31 is connected to positive lead 33 and may be closed to contact 35 for a right-turn signal and to contact 37 for a left-turn signal. In the conventional vehicle signalling circuit, the signal thermal switch is located in common lead 33. However, two thermal switches 41 and 43 are employed in the modified circuitry and are disposed respectively in right-hand main lead 45 and left-hand main lead 47. Right front turn indicator lamp 49 is shown connected from lead 45 to ground, with dash indicator lamp 51 and right rear lamp 53 being connected in parallel therewith.

Thus, when switch 31 is in its right-turn signalling position, the positive voltage is extended via contact 35 to lead 45, through thermal switch 41 to right lamps 49, 51 and 53. Current flows through switch 41, causing it to open and close intermittently, thereby blinking the signalling lamps.

Similarly, when switch 31 is closed to its left-turn indicating position, current passes via contact 37 and lead 47 to lamps 55, 57 and 59. The switch 43 causes the same type signalling for the left-hand turn lamps.

Coils 10R and 10L for electromagnets 5 (R for right and L for left) are shown connected in parallel and across the indicator switch by leads 61 and 63. Lead 61 is grounded by way of lamp or a resistor or resistance wire 65, and lead 63 is similarly grounded over element 67.

Coils 10R and 10L are wound so that current flow for right-hand signalling along lead 61 causes polarization in one direction and current flow for left-hand signalling into lead 63 causes polarization in the opposite direction. These coils are intended to operate with permanent magnetic strip 22 (FIGS. 2 and 3) suitably secured to the reverse side of the case 11, as by cement desirably with or without magnetic insulation interposed between the case and strip, depending upon whether or not the case is of magnetic material.

Since one end of strip 22 is polarized north and the other end south, polarization of the coils 10R and 10L in one direction will cause pivotal movement of the mirror in one direction and opposite polarization of the coils will cause the mirror to be angled in the opposite direction.

It should be noted that thermal switches 41 and 43 are normally closed, and thus if indicator switch 31 is in its right-hand position, switch 43 remains normally closed. Current flow is then along conductor 61, through coils 10R and 10L to ground via lamp 67 and lamps 55, 57 and 59.

In the absence of diodes 62 and 64, by suitable design, with resistance wire comprising coils 10R and 10L, or resistors in series therewith, or with a suitably low resistance element 67, the largest portion of the voltage may be dropped across the coils so that the left-hand turn signals do not light and switch 43 does not operate. However, it should be noted that even if switch 43 were to operate or were to be faulty, a ground connection is had over element 67. For the opposite signalling turn, element 65 functions similarly. Thus, with modification of conventional circuitry, which is readily effected, the requisite control is inexpensively obtained.

Diodes 62 and 64 may be employed to insure that only elements 65 and 67 serve as grounds for the coil currents, which insures that this circuit is completely independent of the signalling lamp circuits.

In FIG. 11, there is shown a suitable strip 71 of magnetizable material adapted to replace the strip 22 of FIG. 3 and to be affixed to the rear side of case 11. Suitable spaces (not shown) are disposed between strip 71 and case 11 to accommodate the coil 73. This coil enables polarization of strip 71 to be reversed, depending upon the direction of current flow through coil 73. It also may be noted that strip 71 (and strip 22) may be shaped to offset shaft 9, as shown in FIG. 11.

FIG. 12 shows a circuit which operates in similar manner with that described in connection with FIG. 10 but accommodates electro-armature coil 73, along with electromagnetic coils 10R and 10L. The coils in this circuit are also connected to afford the multi-power action of a similar type to that heretofore described.

Main leads 61 and 63 correspond to the similarly numbered leads in FIG. 10, as do also elements 65 and 67. The turn switch 31 is connected to lead 33 and is adapted to be thrown to the right to contact 35 and to the left to contact 37. Battery 90 is shown connected between lead 33 and elements 65 and 67.

The remaining portion of the turn indicator circuitry is not shown but the operation is as explained heretofore with leads 45 and 47 being taken from contacts 35 and 37, respectively.

Essentially, coils 73, 10R and 10L are in parallel except that in tracing out the wiring, it will be noted that in reality coils 10L and 10R are in parallel with coil 73 being in parallel with element 67 in series with said parallel combination. In tracing out the current flow, it will readily be apparent that the polarization of coils 10R and 10L is reversed for the respective positions of lever 31, but the polarization of coil 73 remains the same for both positions. This is achieved through the use of diodes 75 and 77.

With switch 31 in the right-hand position, current is passed to contact 35 and via optional diode 62 (as heretofore explained) along lead 61 and through coils 10L and 10R in parallel to return to ground via element 67, diode 64 serving to isolate this current from the left-hand indicator bank lamps. In addition, current flow is from right to left through coil 73 via rectifier 75.

With turn indicator 31 to the left, current flow extends through rectifier 64 and lead 63 to the parallel combination of coils 10L and 10R, returning to ground over element 65. At the same time current passes rectifier or diode 77 and diode 75 to flow through coil 73 in the same direction as before to ground. In this manner polarization is maintained to angle the mirror properly while power gain is obtained by the simultaneous push-pull action.

A further embodiment of the invention is shown in FIG. 13 wherein the electromagnetics 102 and 102A are carried on the reverse side of case 101, being affixed thereto by an adhesive or other suitable means. The case 101 is connected to shaft 105 by pivot 106 such that suction cup 108 (or its equivalent) may be affixed to the windshield of the vehicle which is not illustrated. In this manner the mirror in case 101 may be pivoted relative to the vehicle. Shaft 107 carries cross-bar 104 rigidly affixed thereto by pins 116 adjacent to the coils 112 and 113 of the electromagnets 102 and 102A, pins 116 serving suitably to attach cross-bar 104 to shaft 107 in a permanent fashion.

Secured to cross-bar 104 is bar 122 which may comprise either the permanent polarized magnetic strip 22 or the electromagnetizable armature 71 heretofore described.

Centering springs 120 are shown connected between opposite ends of cross-bar 104 and case 101. Universal connection 115 for shaft 107 permits adjustment of the mirror to the individual's height and desires. Leads 111 are shown interconnected for the coils 112 and 113 and the apparatus of FIG. 13 is adapted for operation from either of the circuits of FIGS. 10 or 12.

A housing 110 forming a dust or concealing shield is adapted to conceal and otherwise contain the components just described.

What is claimed is:

1. Rearview mirror angling apparatus for supporting a mirror case and reflector between said case and a vehicle support and for angling the mirror case relative to the vehicle in response to the vehicle turn indicating lever comprising, in combination, a frame connecting said case and vehicle support comprising means providing pivotal movement of the mirror case relative to the frame, and means providing universal movement of the frame relative to the vehicle support; spring means to center the case relative to the frame, a pair of electrically connected electromagnets having opopsite polarization mounted in spaced apart locations on only one of the case and the frame, a permanent magnet mounted on the other of the case and the frame and having its poles opposite said electromagnets, and means to energize the electromagnets and influence their polarization.

2. The apparatus of claim 1 further comprising locking means for fixing the relative position of said mirror case and frame in the absence of energization of said electromagnets; energization of said electromagnets releasing said locking means.

3. The apparatus of claim 2 wherein said pair of electromagnets is mounted on the frame and said permanent magnet is mounted on the case.

References Cited

UNITED STATES PATENTS

| | | | |
|---|---|---|---|
| 2,638,035 | 5/1953 | MacGeorge et al. | 350—289 |
| 2,806,408 | 9/1957 | Moeller | 350—279 |
| 3,059,539 | 10/1962 | Meade | 350—281 |
| 3,158,796 | 11/1964 | Musgrave | 335—230 |
| 3,199,075 | 8/1965 | Simmons | 350—289 X |
| 3,203,447 | 8/1965 | Bremner et al. | |

FOREIGN PATENTS 211,691  10/1960  Austria.

DAVID SCHONBERG, Primary Examiner

J. W. LEONARD, Assistant Examiner

U.S. Cl. X.R.

335—233, 254; 350—307